(12) United States Patent
Zank et al.

(10) Patent No.: US 7,249,804 B2
(45) Date of Patent: Jul. 31, 2007

(54) WHEEL BALANCING WEIGHT WITH HALF-CLIP

(75) Inventors: Chris C Zank, Mt. Juliet, TN (US); Phillip W. Snyder, White House, TN (US); Steven J. Schmidt, Franklin, TN (US); Shelah D. Phillips, Murfreesboro, TN (US); Michael P. Astorino, Brentwood, TN (US)

(73) Assignee: Perfect Equipment Inc., Lavergne, TN (US)

( * ) Notice: Subject to any disclaimer, the term of this patent is extended or adjusted under 35 U.S.C. 154(b) by 0 days.

(21) Appl. No.: 10/666,155

(22) Filed: Sep. 19, 2003

(65) Prior Publication Data

US 2005/0062331 A1   Mar. 24, 2005

(51) Int. Cl.
*B60B 1/00* (2006.01)
(52) U.S. Cl. .................................................... 301/5.21
(58) Field of Classification Search .............. 301/5.21, 301/154.1, 53.5, 5.22, 37.108; 73/66; 74/573 R
See application file for complete search history.

(56) References Cited

U.S. PATENT DOCUMENTS

| | | | | |
|---|---|---|---|---|
| 382,091 A | | 5/1888 | Kelsea | |
| 1,997,825 A | * | 4/1935 | Hume | 301/5.21 |
| 2,036,757 A | * | 4/1936 | Hume | 301/5.21 |
| 2,122,064 A | * | 6/1938 | Hume | 301/5.21 |
| 2,122,065 A | * | 6/1938 | Hume | 301/5.21 |
| 2,248,265 A | * | 7/1941 | Wright | 301/5.21 |
| 2,304,816 A | | 12/1942 | Griffith | 301/5.21 |
| 2,370,361 A | | 2/1945 | Jeune | 301/5.21 |
| 2,548,842 A | * | 4/1951 | McCrorey | 301/5.21 |
| 2,632,673 A | | 3/1953 | Pfeiffer | 301/5.21 |
| 2,640,727 A | | 6/1953 | Kennedy | 301/5 |
| 2,765,998 A | | 10/1956 | Engert | 248/29 |
| 3,002,388 A | | 10/1961 | Bageman | 301/5.21 |
| 3,154,347 A | | 10/1964 | Griffith | 301/5.21 |
| 3,273,941 A | | 9/1966 | Skidmore | 301/5.21 |
| 3,669,500 A | * | 6/1972 | Ende | 301/5.21 |
| 3,688,380 A | * | 9/1972 | Hofmann et al. | 29/243.56 |
| 3,890,008 A | * | 6/1975 | Lejeune | 301/5.21 |
| 3,960,409 A | | 6/1976 | Songer | 301/5.21 |
| 4,300,803 A | | 11/1981 | Cjorosevic | 301/5.21 |
| 4,619,253 A | | 10/1986 | Anhauser et al. | 602/42 |
| 5,350,220 A | | 9/1994 | Atwell, Jr. | 301/5.21 |
| 5,507,333 A | | 4/1996 | Augier | 152/379.3 |
| 5,770,288 A | | 6/1998 | Carney, Jr. | 428/40.1 |
| 5,876,817 A | | 3/1999 | Mathna et al. | 428/40.1 |
| 6,238,005 B1 | | 5/2001 | Sugayauchi et al. | 301/5.21 |

(Continued)

FOREIGN PATENT DOCUMENTS

EP    1069340 A1 *    1/2001

*Primary Examiner*—Russell D. Stormer
(74) *Attorney, Agent, or Firm*—Woodcock Washburn LLP

(57) ABSTRACT

A wheel-balancing weight mounts to a wheel with a flange. The weight has a weighted body and a clip securely attached thereto. The clip has a gripping section and the body has a gripping portion generally opposite the gripping section of the clip. The gripping section of the clip and the gripping portion of the body in combination define a compartment therebetween, where the compartment receives the flange therein when the weight is mounted thereto such that the gripping section of the clip and the gripping portion of the body are on opposite sides of the flange and grip the flange therebetween.

8 Claims, 2 Drawing Sheets

U.S. PATENT DOCUMENTS

| | | | |
|---|---|---|---|
| 6,250,721 B1 * | 6/2001 | Oba et al. | 301/5.21 |
| 6,260,929 B1 | 7/2001 | Oba et al. | 301/5.21 |
| 6,286,906 B1 | 9/2001 | Nagashima et al. | 301/5.21 |
| 6,364,422 B1 * | 4/2002 | Sakaki et al. | 301/5.21 |
| 6,413,626 B1 | 7/2002 | Wollner | 428/317.3 |
| 6,553,831 B1 | 4/2003 | Schmidt et al. | 73/470 |
| 6,948,781 B2 * | 9/2005 | Sery | 301/5.21 |

* cited by examiner

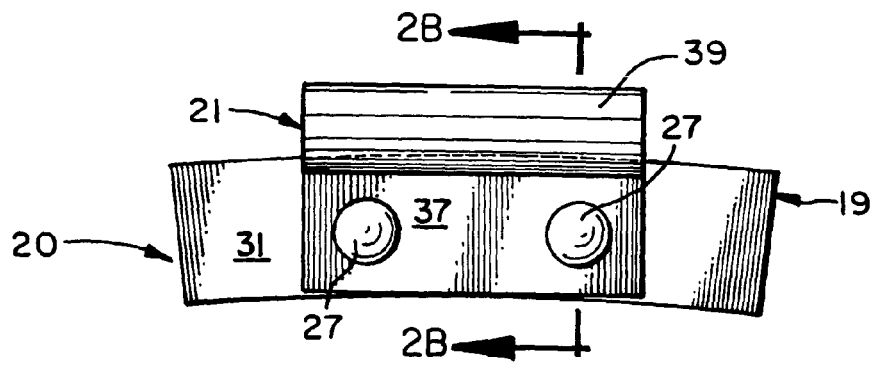
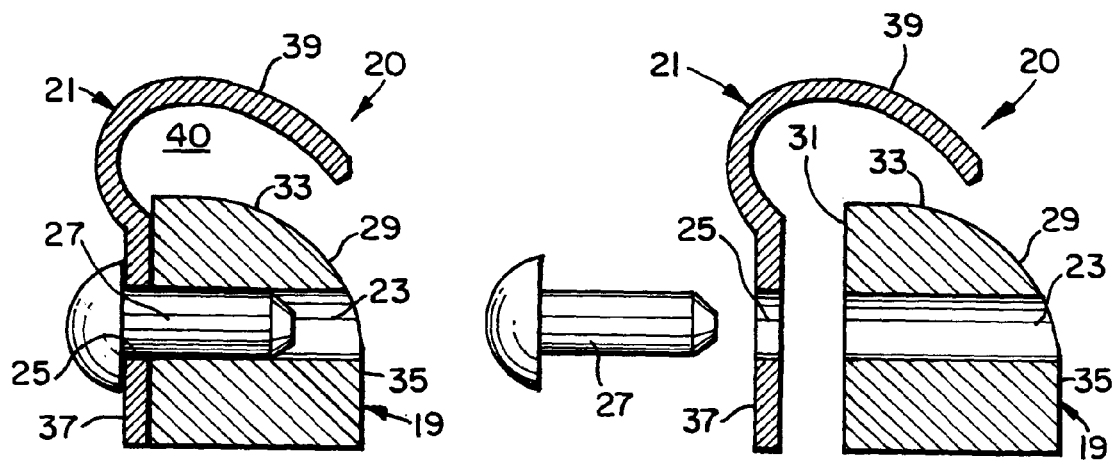
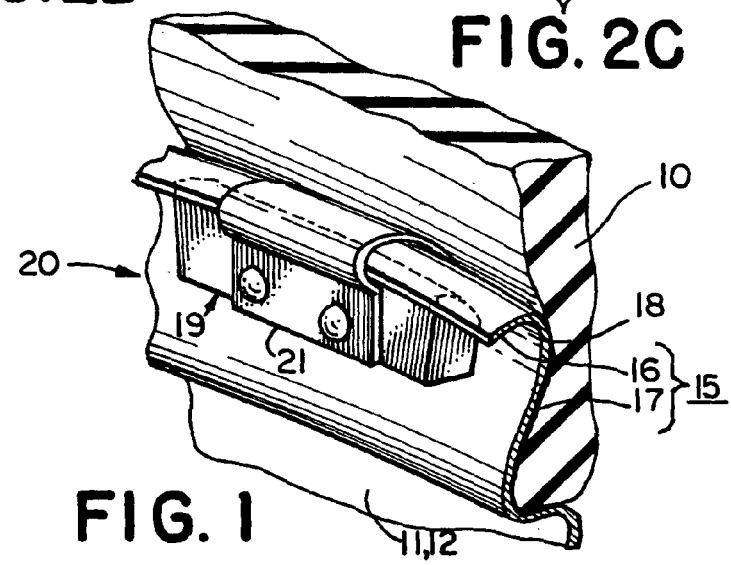

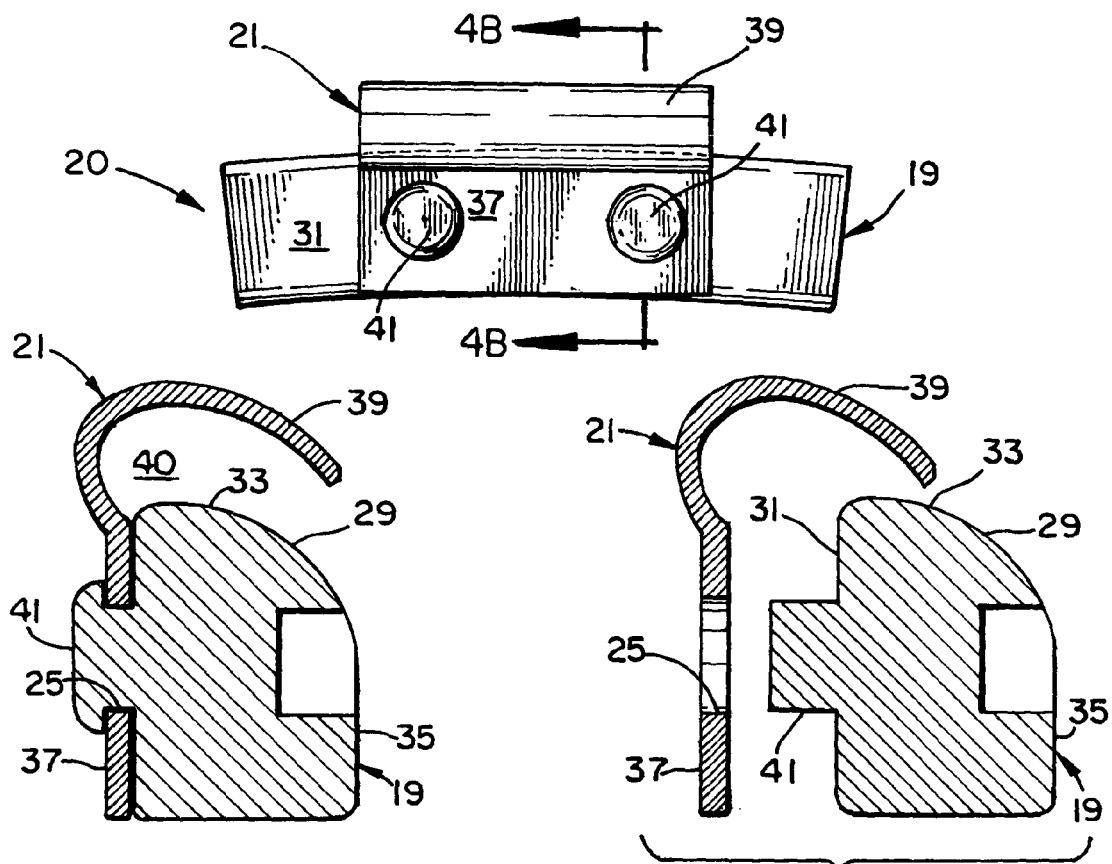
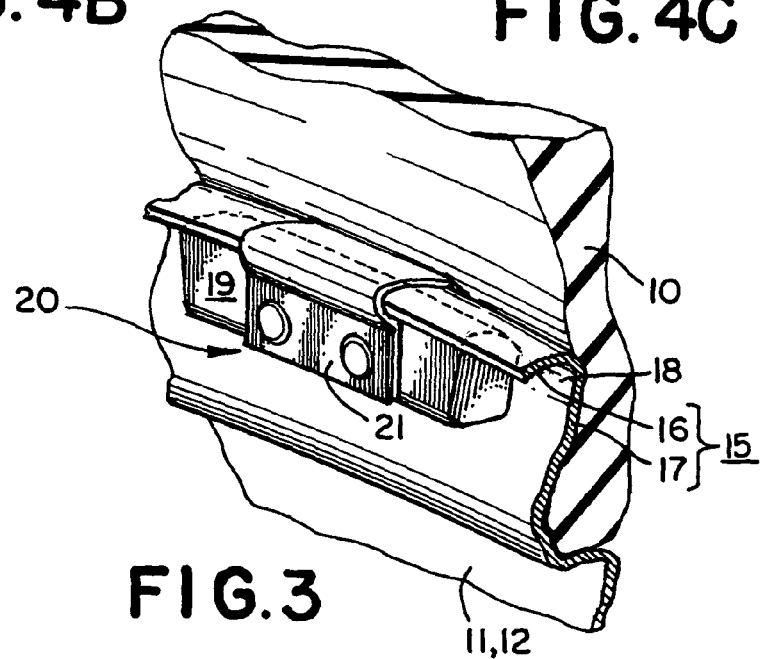

WHEEL BALANCING WEIGHT WITH HALF-CLIP

FIELD OF THE INVENTION

The present invention relates to a wheel-balancing weight for balancing a wheel of a vehicle or the like. More particularly, the present invention relates to a wheel balancing weight with a body and a half-clip that co-acts with the metal body to grasp a portion of the wheel.

BACKGROUND OF THE INVENTION

In the manufacture of pneumatic tires and also wheels and rims for pneumatic tires, it is exceedingly difficult if not impossible to produce a tire, a wheel, or the combination thereof in perfect rotational balance. As known, when out of balance, such a tire, wheel, or combination thereof, vibrates excessively upon rotation and can cause damage to adjacent, coupled-to and/or related components.

Accordingly, and as is known, such tire, wheel, or combination thereof is balanced by appropriately applying one or more counter-balancing weights to compensate for a measured imbalance. Methods of measuring imbalance and determining where to apply the counter-balancing weights are generally known to the relevant public and therefore need not be described herein.

Heretofore, such a counter-balancing weight has been constructed to have a body formed from lead or the like as a unitary mass around a steel clip, where the steel clip securely clips on to an exterior circumferential flange or lip at the rim of the wheel. However, the use of lead has come to be discouraged for environmental reasons, among others.

Accordingly, a need exists for a wheel-balancing weight with a body formed from a material other than lead. More particularly, a need exists for such a wheel-balancing weight that is simple in design and manufacture and therefore is affordable in cost.

SUMMARY OF THE INVENTION

The aforementioned need is satisfied by a wheel-balancing weight for mounting to a wheel with a flange. The weight has a weighted body and a clip securely attached thereto. The clip has a gripping section and the body has a gripping portion generally opposite the gripping section of the clip. The gripping section of the clip and the gripping portion of the body in combination define a compartment therebetween, where the compartment receives the flange therein when the weight is mounted thereto such that the gripping section of the clip and the gripping portion of the body are on opposite sides of the flange and grip the flange therebetween.

BRIEF DESCRIPTION OF THE DRAWINGS

The foregoing summary as well as the following detailed description of the present invention will be better understood when read in conjunction with the appended drawings. For the purpose of illustrating the invention, there are shown in the drawings embodiments that are presently preferred. As should be understood, however, the invention is not limited to the precise arrangements and instrumentalities shown. In the drawings:

FIG. 1 is a broken-away perspective view of a wheel-balancing weight in accordance with one embodiment of the present invention, where the weight is mounted to a rim of a wheel;

FIG. 2A is a plan view of the weight of FIG. 1;

FIG. 2B is a cross-sectional view taken along line 2B-2B of FIG. 2A in accordance with one embodiment of the present invention;

FIG. 2C is an exploded cross-sectional view taken along line 2B-2B of FIG. 2A in accordance with one embodiment of the present invention;

FIG. 3 is a broken-away perspective view of a wheel-balancing weight in accordance with another embodiment of the present invention, where the weight is mounted to a rim of a wheel;

FIG. 4A is a plan view of the weight of FIG. 3;

FIG. 4B is a cross-sectional view taken along line 4B-4B of FIG. 4A in accordance with one embodiment of the present invention; and FIG. 4C is an exploded cross-sectional view taken along line 4B-4B of FIG. 4A prior to assembly in accordance with one embodiment of the present invention.

DETAILED DESCRIPTION OF PREFERRED EMBODIMENTS

Certain terminology may be used in the following description for convenience only and is not considered to be limiting. For example, the words "left", "right", "upper", and "lower" designate directions in the drawings to which reference is made. Likewise, the words "inwardly" and "outwardly" are directions toward and away from, respectively, the geometric center of the referenced object. The terminology includes the words above specifically mentioned, derivatives thereof, and words of similar import.

A pneumatic tire such as may be used in connection with an automobile or the like is mounted upon a drop center rim of an automobile wheel or the like. An example of such a tire, rim, and wheel is shown and disclosed in U.S. patent application Ser. No. 09/723,367, filed Nov. 28, 2000 and hereby incorporated by reference in its entirety.

It is to be appreciated that the tire may be mounted to the wheel in any conventional or unconventional manner and the tire may be of any variety or manufacture without departing from the spirit or scope of the present invention. The tire and wheel or wheel alone may be balanced manually or by spin balancing or by any other method without departing from the spirit and scope of the present invention.

As is known, wheel and wheel with tire mounted thereupon are balanced with respect to the axis thereof and in particular can be balanced on both the inboard and outboard sides of the wheel at or about the rims thereof. Generally, a wheel with or without a tire mounted upon the wheel is balanced by measuring the imbalance and then attaching a weighted mass at an angular location on a rim of the wheel such that the measured imbalance is counter-balanced by the weighted mass.

Typically, a drop center rim of a wheel extends axially and circumferentially. The wheel also includes a central well portion through which bolts on a vehicle typically extend to attach the wheel to such vehicle. As seen in FIGS. 1 and 3, the rim 11 contains one or more flanges 15 extending generally axially and/or radially outwardly from the rim 11 and circumferentially around the rim 11. The rim 11 may have an inboard flange 15 and an outboard flange 15.

Each flange 15 as shown may be constructed by crimping a portion of the rim 11 so as to form an axially extending lip 16. As seen in FIGS. 1 and 3, the lip 16 may reside at the distal portion of a generally radially outwardly extending brim 17. As may be appreciated, in addition to radially displacing the lip 16 from the main portion of the rim 11, the brim 17 also acts to secure the pneumatic tire 10 onto the rim 11. Also, acting together, the lip 16 and the brim 17 of the flange 15 define a pocket 18 within which the weighted body 19 of a wheel balancing weight 20 may be nestled.

It is to be recognized that the flange 15 may also have other dimensional features without departing from the spirit and scope of the present invention. As shown in the drawings, the flange 15 extends generally axially and generally radially outwardly in an S-shape as viewed in toroidal cross-section, but it should be understood that the flange 15 may extend in another direction. Additionally, the flange 15 may vary in dimension, location and in number, all without departing from the spirit and scope of the invention.

Referring to the drawings in detail, wherein like numerals are used to indicate like elements throughout, there is shown in FIGS. 1 and 2A-2C, a wheel-balancing weight 20 installed on the lip 16 of the flange 15 in accordance with one embodiment of the present invention. The weight 20 includes the weighted body 19 and a clip 21 securely coupled to the body 19, where the clip 21 is for securely attaching the body 19 to the lip 16 of the flange 15.

Typically, the clip 21 is constructed in an appropriate shape and manner from a durable material such as spring steel so that the clip 21 securely attaches the body 19 to the lip 16 of the flange 15. Although the weighted body 19 could be formed from any particular material and in any particular manner without departing from the spirit and scope of the present invention, it is presently desirable to construct the body 19 from a material other than lead, primarily for environmental reasons. In such a case, the body 19 may be constructed from a material such as steel, copper, brass, or the like, by way of stamping, forming, rolling, pressing, casting, or the like.

In the prior art, where the body 19 was constructed from lead, it was typical to form the wheel-balancing device 20 by positioning molten lead around a portion of the clip 21, perhaps with the aid of a mold. However, in the case where the body 19 is constructed from another material such as steel, which has a higher melting point than lead, the same molten construction technique is not feasible for the reason that the molten steel would likely melt or deform the clip 21, among others. Accordingly, and in one embodiment of the present invention, the body 19 of the weight 20 is constructed apart from the clip 21 of the weight 20 and is then attached thereto.

In particular, in one embodiment of the present invention, and as seen in FIGS. 1 and 2A-2C, the body 19 of the weight 20 is constructed to include one or more apertures 23, the clip 21 of the weight 20 is constructed to include one or more apertures 25 corresponding to and aligned with the apertures 23, and the weight 20 includes an attaching member 27 inserted through each aperture 25 of the clip 21 and into the corresponding aperture 23 of the body 21 to secure the clip 21 to the body 19. As shown, the body 19 has two apertures 23, the clip 21 has two corresponding apertures 25, and the weight 20 thus includes two attaching members 27, although greater or lesser numbers of apertures 23, 25 and attaching members 27 may also be employed without departing from the spirit and scope of the present invention.

As shown, each aperture 23, 25 is axially aligned to be generally parallel to the axis of the wheel 12 and rim 11. Accordingly each attaching member 27 inserted through a corresponding pair of apertures 23, 25 is likewise axially aligned to be generally parallel to the axis of the wheel 12 and rim 11. Note, though, that other alignments may be employed without departing from the spirit and scope of the present invention.

As also shown, each attaching member 27 is a stud, although the attaching member 27 may also be a screw, a rivet, or the like without departing from the spirit and scope of the present invention. As should be appreciated, each stud 27 should maintain a tight interference fit within the corresponding aperture 23 of the body 21 so that the stud 27 cannot easily be removed therefrom or fall out therefrom. Accordingly, each stud 27 secures the clip 21 to the body 19 to form the weight 20.

In the prior art, where the body 19 was constructed from lead, the body 19 was too malleable to assist in gripping the weight 20 to the lip 16 of the flange 15 to secure the weight 20 to the flange 15. That is, if the lead were to be employed to grip the lip 16 of the flange 15, the lead would over a relatively short period of time deform under gripping stress to the point that the lead could no longer in fact grip the lip 16 of the flange 15. Accordingly, in the prior art, the clip 21 was solely responsible for gripping the lip 16 and securing the weight 20 the flange 15.

However, in the case of the present invention, where the body 19 is constructed from another material such as steel, the body 19 is not nearly as malleable and therefore can in fact assist the clip 21 in gripping the weight 20 to the lip 16 of the flange 15 to secure the weight 20 to the flange 15. In particular, and as seen in FIGS. 1 and 2A-2C, in one embodiment of the present invention, the weight 20 is mounted to and secured to the flange 15 of the rim 11 by positioning the body 19 and clip 21 of the weight 20 on opposite sides of the lip 16 and gripping such lip 16 therebetween. As may be appreciated, by doing do, the clip 21 has a simpler design and can be constructed in a less expensive manner.

In one embodiment of the present invention, and as particularly seen in FIG. 2C, the body 19 of the weight 20 has a flange face 29 that faces toward the flange 15 of the rim 11, and an attaching face 31, where the clip 21 is attached to the body 19 at the attaching face 31 thereof. As seen, the flange face 29 further has a gripping portion 33 that grips the lip 16 of the flange 15 in concert with the clip 19, and a brim portion 35 that faces toward the brim 17 of the flange 15, more or less. As shown, the attaching face 31 is generally planar, the gripping portion 33 of the flange face 29 extends generally normally from the attaching face 31 and curves toward and joins the brim portion 35 of the flange face 29, and the brim portion 35 of the flange face 29 is generally opposite the attaching face 31. Of course, the body 19 may have any other facial configuration without departing from the spirit and scope of the present invention.

As also particularly seen in FIG. 2C, the clip 21 of the weight 20 has an attaching section 37 and a gripping section 39 extending from the attaching section 37. As seen, the attaching section 37 of the clip 21 is generally planar and corresponds to the attaching face 31 of the body 19 such that the attaching section 37 of the clip 21 closely fits to the attaching face 31 of the body 19 when the clip 21 is secured to the body 19 by way of the one or more attaching members 27. As also seen, with the clip 21 so attached to the body 19, gripping section 39 of the clip 21 curves along with but is separable from the gripping portion 33 of the flange face 29 of the body 19 such that the lip 16 of the flange 15 may be fitted and securely gripped therebetween. More particularly, and as best shown, in FIG. 2B, the gripping section 39 of the clip 21 extends from the attaching section 37 by firstly extending away at an angle of roughly 135 degrees or so from the gripping portion 33 of the flange face 29 of the body 19 and also away from the attaching face 31 of the body 19 (i.e., up and to the left in FIG. 2B), and secondly curving back toward and then along with but separate from the gripping portion 33 of the flange face 29 of the body 19 (i.e., to the right and then curving downward in FIG. 2B). As a result, and as should be appreciated, the compartment 40 defined by the gripping section 39 extends along the gripping portion 33 of the flange face 29 of the body 19 and beyond a plane generally coextensive with the attaching face 31 of the body 19 (i.e., beyond the left side of such plane in FIG. 2B). Thus, such compartment 40 thereby allows a distal edge of the lip 16 of the flange 15 when received thereinto to likewise extend beyond the plane generally coextensive with the attaching face 31 of the body 19. As a result, the weight 20 can accept more of the flange 15 and therefore be nestled more closely within the pocket 18. As also shown, the gripping section 39 of the clip 21 has a distal edge that is right-most in FIGS. 2B and 2C, and the distal edge resides in a plane that is generally coextensive with the brim portion 35 of the flange face 29 of the body 19. Thus, the clip 21 as extending generally to the plane of the brim portion 35 of the body is a 'half-clip' in that the clip 21 grips the flange 15 along with the body 19, and in that the clip 21 and the body 19 in combination define a compartment 40 within which the flange 15 is received.

Accordingly, with the weight 20 mounted to the rim 11, as is particularly seen in FIG. 1, the bulk of the body 19 of the weight 20 is fitted within the pocket 18 formed in the flange 15 by the lip 16 and brim 17, and the brim portion 35 of the flange face 29 faces substantially toward the brim 17 of the flange 15. As also seen, the attaching section 37 of the clip 21 is substantially exposed, as is the bulk of the gripping section 39 of the clip 21.

To facilitate the fitting of the body 19 of the weight within the pocket 18, and as best seen in FIG. 2A, the body 19 of the weight 20 may be generally longitudinally arcuate. The clip 19 of the weight 20 may also be generally longitudinally arcuate (not shown), but this has not been found to be a necessary requirement.

In another embodiment of the present invention, and as seen in FIGS. 3 and 4A-4C, the body 19 of the weight 20 is constructed to include one or more protrusions 41 rather than the one or more apertures 23 as before, and the clip 21 of the weight 20 is constructed to include one or more apertures 25 corresponding to and aligned with the protrusions 41. As may be appreciated from FIGS. 4B and 4C in particular, in the embodiment, the each protrusion 41 on the body 19 is fitted through the corresponding aperture 25 of the clip 21 and the protrusions 41 are then compressed and flattened to secure the clip 21 to the body 19 in the manner of a rivet. As shown, the body 19 has two protrusions/rivets 41, and the clip 21 has two corresponding apertures 25, although greater or lesser numbers of apertures 25 and protrusions/rivets 41 may also be employed without departing from the spirit and scope of the present invention.

Note that the embodiment as shown in FIGS. 3 and 4A-4C has the advantage of less parts in that attaching members 27 need not be employed. However, it may be the case that compressing and flattening each protrusion 41 to result in a rivet is relatively difficult, especially if the body 19 is constructed from a hard material such as a steel. In such case, a heavy-duty or high-powered compressing/flattening tool may be required, such as a cold forge or a large hammer.

As before, the weight 20 of FIGS. 3 and 4A-4C is mounted to and secured to the flange 15 of the rim 11 by positioning the body 19 and clip 21 of the weight 20 on opposite sides of the lip 16 and gripping such lip 16 therebetween. As also before, the attaching section 37 of the clip 21 is generally planar and corresponds to the attaching face 31 of the body 19 such that the attaching section 37 of the clip 21 closely fits to the attaching face 31 of the body 19 when the clip 21 is secured to the body 19 by way of the one or more attaching members 27. With the clip 21 so attached to the body 19, gripping section 39 of the clip 21 curves along with but is separable from the gripping portion 33 of the flange face 29 of the body 19 such that the lip 16 of the flange 15 may be fitted and securely gripped therebetween. Thus, and again, the clip 21 of the weight 20 of FIGS. 3 and 4A-4C is a 'half-clip' in that the clip 21 grips the flange 15 along with the body 19, and in that the clip 21 and the body 19 in combination define a compartment 40 within which the flange 15 is received.

Accordingly, and also as before with the weight 20 mounted to the rim 11, as is particularly seen in FIG. 3, the bulk of the body 19 of the weight 20 is fitted within the pocket 18 formed in the flange 15 by the lip 16 and brim 17, and the brim portion 35 of the flange face 29 faces substantially toward the brim 17 of the flange 15. As also seen, the attaching section 37 of the clip 21 is substantially exposed, as is the bulk of the gripping section 39 of the clip 21.

As before, to facilitate the fitting of the body 19 of the weight within the pocket 18, and as best seen in FIG. 4A, the body 19 of the weight 20 may be generally longitudinally arcuate. The clip 21 of the weight 20 may also be generally longitudinally arcuate (not shown), but this has not been found to be a necessary requirement.

With regard to either embodiment of the present invention, to enhance gripping and to prevent slippage with regard to the flange 15, the clip 21 and/or the body 19 of the weight may be provided with a surface having a relatively high coefficient of friction. Such surface may be imparted during formation or may be imparted afterward by way of an appropriate surface coating.

Note that as shown in the drawings the clip 21 of the weight 20 rests directly on the surface of the body 19 of such weight 20. However, and in another embodiment of the present invention, it may be the case that the clip 21 rests within a recess on such surface of such body 19. As may be appreciated, such an arrangement may be necessary to facilitate mounting of the clip 21 to the body 19 and/or to facilitate mounting the weight 20 to a wheel 12. Such an arrangement may also be employed if necessary to adjust the dimensions of compartment 40 and may also be perceived as more aesthetically pleasing.

In the foregoing description, it can be seen that the present invention comprises a new and useful wheel-balancing weight 20 with a body 19 formed from a material other than lead. The weight 20 includes a half-clip 19 therein, is simple in design and manufacture, and therefore is affordable in cost. It should be appreciated that changes could be made to the embodiments described above without departing from the inventive concepts thereof. For one example, the presence of a tire 10 is not essential to the present invention and the invention encompasses the use of the wheel-balancing weight 20 to counter-balance the wheel 12 only. It should be understood, therefore, that this invention is not limited to the particular embodiments disclosed, but it is intended to cover modifications within the spirit and scope of the present invention as defined by the appended claims.

What is claimed is:

1. A wheel-balancing weight for mounting to a wheel with a flange, the weight comprising a weighted body and a clip securely attached thereto, the clip having a gripping section and the body having a gripping surface generally opposite the gripping section of the clip, the gripping section of the clip and the gripping surface of the body in combination defining a compartment therebetween, the compartment for receiving the flange therein when the weight is mounted thereto such that the gripping section of the clip and the gripping surface of the body are on opposite sides of the flange and grip the flange therebetween, the weighted body having a number of apertures therethrough;

the clip having a like number of apertures therethrough, each aperture in the clip corresponding to an aperture in the body, the weight further comprising a like number of attaching members, each attaching member being inserted through a corresponding aperture of the clip and into a corresponding aperture of the body to secure the clip to the body, the attaching member being a stud maintaining an interference fit within the corresponding aperture of the body, the clip further having a generally planar attaching section by which the clip is attached to the body at a generally planar attaching surface thereof, the clip at the generally planar attaching section thereof being attached to the body in a fixed manner by each attaching member such that the clip is substantially immovable with respect to the body at each attaching member, the clip being formed as a single piece of material to include both the gripping section and the attaching section, the flange having a generally axially extending lip extending from a generally radially extending brim, the lip and brim in combination defining a pocket, the body having a flange face for facing toward the flange, the flange face including the gripping surface for facing toward the lip of the flange and a generally planar brim surface for facing toward the brim of the flange;

the body further having the generally planar attaching surface, the gripping surface of the flange face extending generally perpendicularly from the attaching surface and curving toward and joining the brim surface of the flange face, the generally planar brim surface of the flange face being generally opposite to and generally parallel with the generally planar attaching surface, and the gripping section of the clip extending from the generally planar attaching section by firstly extending away at an angle of about 135 degrees from the gripping surface of the flange face of the body and also away from the attaching surface of the body and secondly curving back toward and then along with but separate from the gripping surface of the flange face of the body such that the compartment defined by the gripping section extends along the gripping surface of the flange face of the body and beyond a plane generally coextensive with the attaching surface of the body, such compartment thereby allowing a distal edge of the lip of the flange when received thereinto to likewise extend beyond the plane generally coextensive with the attaching surface of the body, the generally planar attaching section of the clip being generally parallel to the generally planar attaching surface and the generally planar brim surface of the body, the gripping section of the clip having a distal edge that resides in a plane generally coextensive with the generally planar brim surface of the body.

2. The weight of claim 1 comprising two apertures in the body, two apertures in the clip and two attaching members.

3. The weight of claim 1 wherein the wheel has an axis and each aperture in the clip, each aperture in the body, and each attaching member is axially aligned to be generally parallel to the axis of the wheel.

4. The weight of claim 1 where the body is constructed from steel.

5. A vehicle having a wheel with a flange and a wheel-balancing weight mounted to the flange of the wheel, the weight comprising a weighted body and a clip securely attached thereto, the clip having a gripping section and the body having a gripping surface generally opposite the gripping section of the clip, the gripping section of the clip and the gripping surface of the body in combination defining a compartment therebetween, the compartment for receiving the flange therein when the weight is mounted thereto such that the gripping section of the clip and the gripping surface of the body are on opposite sides of the flange and grip the flange therebetween, the weighted body having a number of apertures therethrough;

the clip having a like number of apertures therethrough, each aperture in the clip corresponding to an aperture in the body, the weight further comprising a like number of attaching members, each attaching member being inserted through a corresponding aperture of the clip and into a corresponding aperture of the body to secure the clip to the body, the attaching member being a stud maintaining an interference fit within the corresponding aperture of the body, the clip further having a generally planar attaching section by which the clip is attached to the body at a generally planar attaching surface thereof, the clip at the generally planar attaching section thereof being attached to the body in a fixed manner by each attaching member such that the clip is substantially immovable with respect to the body at each attaching member, the clip being formed as a single piece of material to include both the gripping section and the attaching section, the flange having a generally axially extending lip extending from a generally radially extending brim, the lip and brim in combination defining a pocket, the body having a flange face for facing toward the flange, the flange face including the gripping surface for facing toward the lip of the flange and a generally planar brim surface for facing toward the brim of the flange;

the body further having the generally planar attaching surface, the gripping surface of the flange face extending generally perpendicularly from the attaching surface and curving toward and joining the brim surface of the flange face, the generally planar brim surface of the flange face being generally opposite to and generally parallel with the generally planar attaching surface, and the gripping section of the clip extending from the generally planar attaching section by firstly extending away at an angle of about 135 degrees from the gripping surface of the flange face of the body and also away from the attaching surface of the body and secondly curving back toward and then along with but separate from the gripping surface of the flange face of the body such that the compartment defined by the gripping section extends along the gripping surface of the flange face of the body and beyond a plane generally coextensive with the attaching surface of the body, such compartment thereby allowing a distal edge of the lip of the flange when received thereinto to likewise extend beyond the plane generally coextensive with the attaching surface of the body, the generally planar attaching section of the clip being generally parallel to the generally planar attaching surface and the generally planar brim surface of the body, the gripping section of the clip having a distal edge that resides in a plane generally coextensive with the generally planar brim surface of the body.

6. The vehicle of claim 5 comprising two apertures in the body, two apertures in the clip and two attaching members.

7. The vehicle of claim 5 wherein the wheel has an axis and each aperture in the clip, each aperture in the body, and each attaching member is axially aligned to be generally parallel to the axis of the wheel.

8. The vehicle of claim 5 where the body is constructed from steel.

* * * * *

UNITED STATES PATENT AND TRADEMARK OFFICE
CERTIFICATE OF CORRECTION

PATENT NO. : 7,249,804 B2  Page 1 of 1
APPLICATION NO. : 10/666155
DATED : July 31, 2007
INVENTOR(S) : Chris C. Zank et al.

It is certified that error appears in the above-identified patent and that said Letters Patent is hereby corrected as shown below:

Column 4,
Line 30, delete "by doing do," and insert -- by doing so, --.

Signed and Sealed this

Fifth Day of August, 2008

JON W. DUDAS
*Director of the United States Patent and Trademark Office*